Patented Jan. 13, 1942

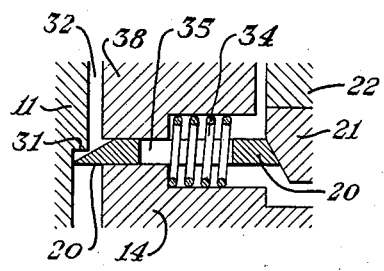
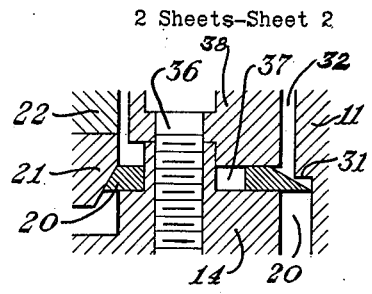
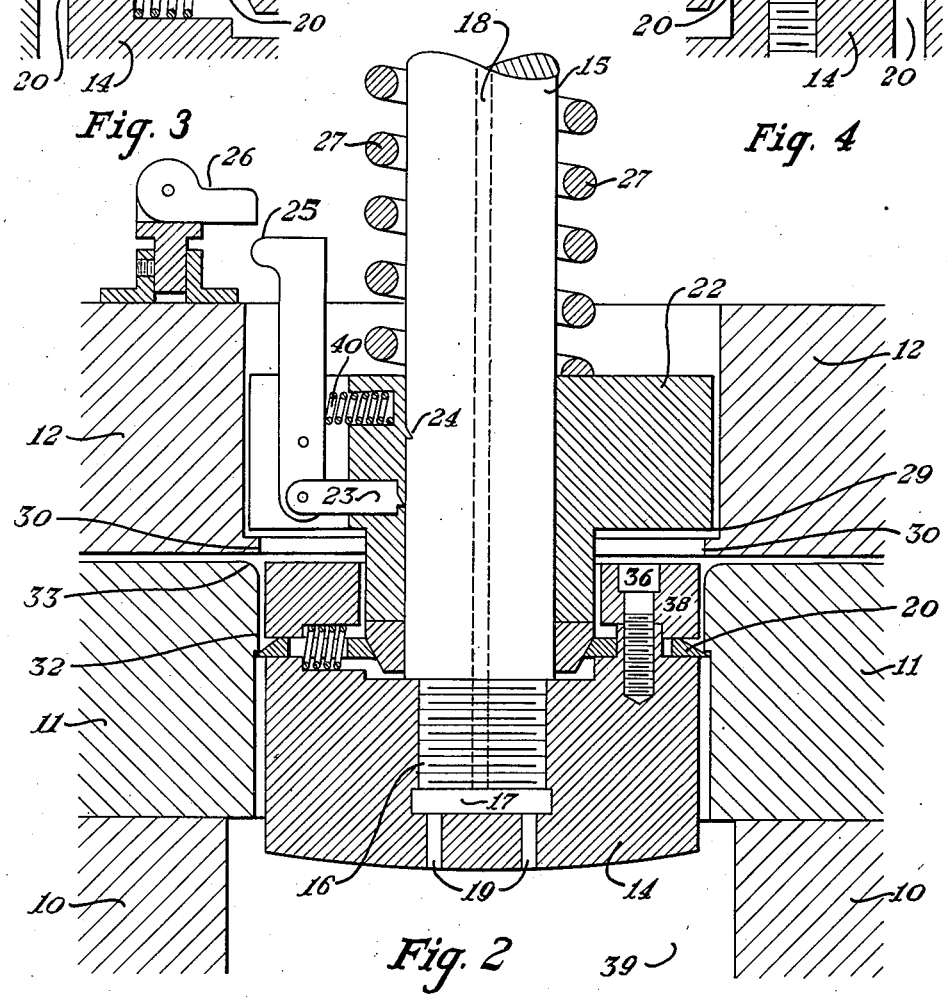
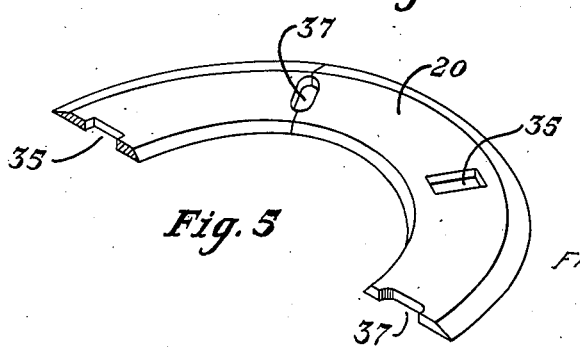

2,270,186

UNITED STATES PATENT OFFICE 2,270,186

FILM DRAWING AND TRIMMING MACHINE

Frederick E. Dulmage, Midland, Mich., assignor to The Dow Chemical Company, Midland, Mich., a corporation of Michigan Application October 4, 1940, Serial No. 359,773

4 Claims. (Cl. 18—19)

The present invention relates to a machine for drawing shaped articles from thermoplastic films, and for trimming the vertical walls of such articles, all substantially in a single working operation.

Machines are known whereby thermoplastic films may be shaped to produce deep drawn articles. It is a usual incident to the operation of such machines that the initially formed drawn article has a ruffled or fluted edge, composed of the excess film not actually required in forming the drawn article. Such unsightly and undesirable excess material must be trimmed from the drawn article for the latter to be useful. The only machine heretofore known which both draws a film and trims excess edge material from the drawn article, has the serious disadvantage of employing a crimping type of cutting element which scores the walls of the drawing die across which the film must be drawn. This results in scratching the films during the drawing process, and the shaped articles are consequently unsightly. Most prior drawing machines have served the sole function of drawing the film, requiring a separate, tedious, trimming step to be performed apart from the drawing machine.

It is, accordingly, among the objects of the invention to provide a machine for drawing shaped articles from thermoplastic films, and for trimming excess material from the walls of the drawn articles, all substantially in a single working operation, the said machine being arranged to avoid possibility of the trimming element thereof scoring the walls of the drawing die, and hence, to avoid scoring fresh film drawn across said die. Other and related objects will be apparent from the following description.

To the accomplishment of the foregoing and related ends, the invention, then, consists of the means hereinafter fully described and particularly pointed out in the claims, the annexed drawings and the following description setting forth in detail certain means for carrying out the invention, such disclosed means illustrating, however, but one of the various ways in which the principle of the invention may be used.

In the said annexed drawings,

Fig. 2 is an enlarged view in typical vertical section of the essential elements of the same machine at a later stage in the cycle of operations;

Figs. 3 and 4 are further enlarged, detailed views of portions of the machine as shown in Figs. 2, and Fig. 5 is a view, partially in section and partially in perspective, of a segmented knife for use in the machine shown in the other figures of the drawings.

Figure 1:
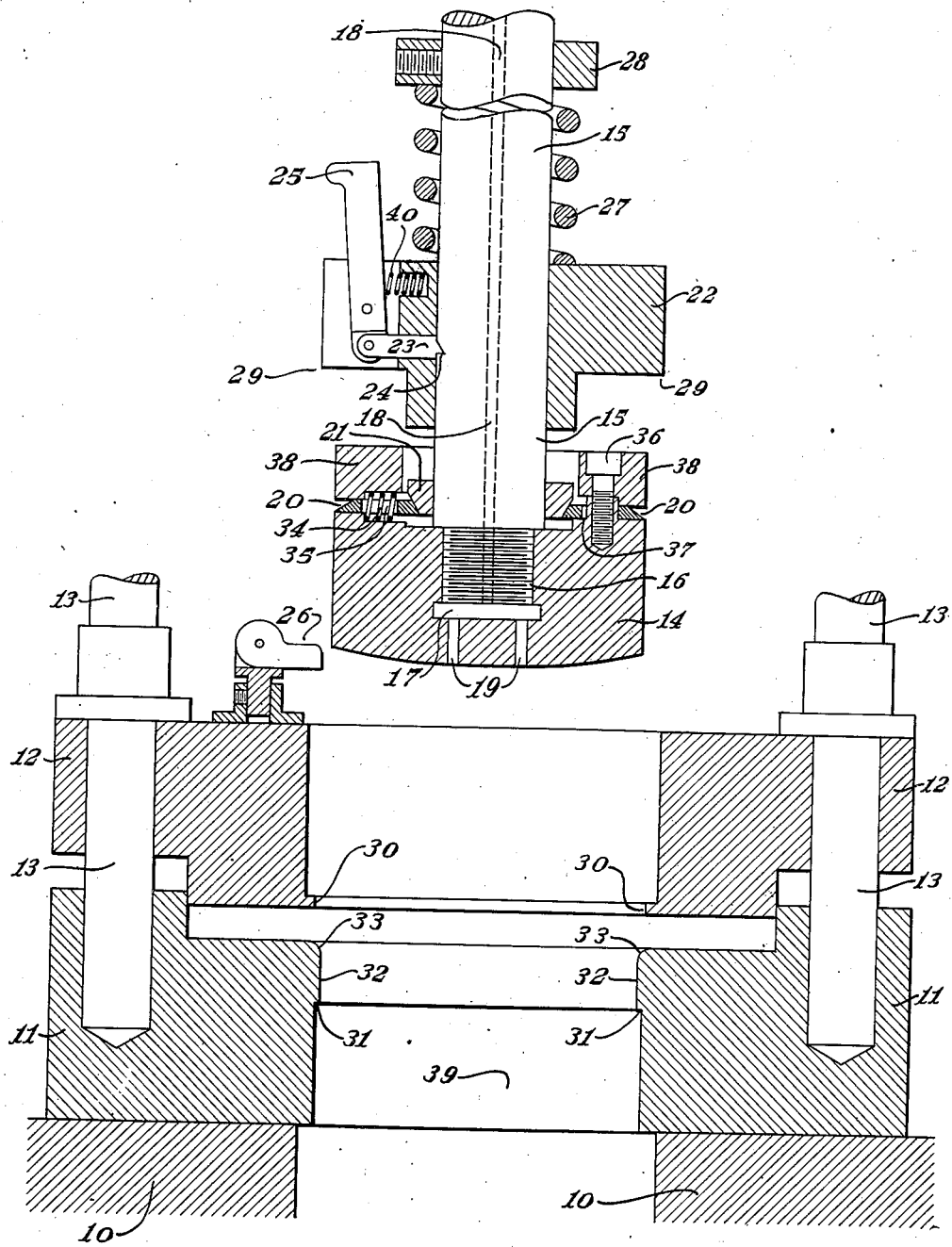
Fig. 1 is a view, in typical vertical section, of an apparatus embodying the invention, ready to begin the cycle of operations.

The present invention is a machine for drawing thermoplastic films and for trimming the vertical walls of the shaped articles substantially in a single working operation, comprising a drawing die and a drawing ram co-operative therewith to produce the desired drawn shape, a shaft supporting the ram and of smaller diameter than the ram, means for holding a film blank across the die opening, a radially expansible segmented knife resting on the ram, radially disposed about the shaft, and of the same shape as the cross-sectional contour of the ram, retaining means for preventing any substantial play of said knife until it is positively actuated to expand the knife radially, means operative when the ram and accompanying knife have penetrated a predetermined depth into the die to expand the knife radially beyond the vertical walls of the ram a distance approximating the thickness of the film being drawn, and means for returning the knife segments from the cutting position to their original undisplaced positions.

In the illustrated and preferred embodiment of the invention, a film drawing machine is mounted on the horizontal platen 10 of a vertical drill press, not shown. The machine comprises a drawing die 11 resting on platen 10 and a clamping ring 12 overlying and serving to engage the die 11 and to hold the thermoplastic film (not shown) across the opening of die 11. Clamping ring 12 is slidably mounted on guide posts 13, which assure maintenance of a fixed positional relationship between the axis of ring 12 and that of die 11. The die member 11 is provided with an opening of the desired size and cross-sectional contour of the article to be drawn, having smooth rounded shoulders 33 and vertical walls 32, said walls being under-cut to provide overhanging shoulders 31 in the outlet port 39.

A drawing piston or ram 14, of the same contour as that of the die opening but smaller than said opening by a factor approximating, but not less than twice the thickness of the film to be drawn, is attached to the lower end of vertical shaft 15, suitably by means of a threaded coupling 16. In the embodiment shown, space is provided between the lower end of coupling 16 and the body of piston 14 to serve as a header 17 to which compressed air or other fluid may be supplied through the hollow-drilled axis 18 in shaft 15, and from which said fluid may emerge via ports 19, to aid in blowing a drawn article from the piston 14 around which it is formed.

A segmented knife 20, co-axial with and radially disposed around shaft 15, rests horizontally on the upper flat plane of ram 14. The knife 20 is of the same shape as the cross-section of the particular ram and die employed, each segment thereof being held individually in a cocked position by springs 34 located in slots 35, until all segments are concurrently actuated and thrust outwardly by downward motion of wedge ring 21, which, in turn, is slidably mounted on shaft 15. Retaining ring 38 overlies knife 20, and is fastened, as by bolts 36 to ram 14, through slots 37 formed in the ends of each segment of knife 20. The ring 38 prevents vertical play of knife 20, bolts 36 serve to prevent circumferential play thereof, and wedge ring 21 gives further stability thereto, all of these elements co-operating to hold knife 20 in position with respect to ram 14 and shaft 15.

A trip hammer 22 is slidably mounted on shaft 15, being engageable therewith by means of pawl 23 and notch 24 at a slight distance above the upper plane of retaining ring 38. Pawl 23 is releasable from notch 24 by downward motion of piston 14 to a point such that trigger 25 is tripped by finger 26, which is adjustable as to height and is mounted on clamping ring 12. An open coil spring 27, compressed when hammer 22 is in engagement with shaft 15, and distended when such engagement is released, is spirally disposed around shaft 15 between hammer 22 and spring stop 28. Hammer 22 is of a size and shape to pass part way through clamping ring 12, and then to come to rest on shoulders 30 provided on the lower internal face of said ring.

In operating the machine to make drawn articles, clamping ring 12 is lifted clear of die 11 and a thermoplastic film is laid flat across the die opening. Ring 12 is slid down onto the film which is thereby clamped between ring 12 and die 11. Ram 14 is lowered through ring 12, and is brought into contact with the film. Further downward movement of ram 14 draws the film to the desired shape between the ram and the walls 32 of die 11. Trip finger 26 is adjusted as to height so as to trip the trigger 25 only after ram 14 and knife 20 are at a level below that of the undercut shoulder 31 in the wall of die 11. As the shaft 15 continues its downward movement, driving ram 14 further into die 11, trigger 25 is tripped by finger 26, releasing pawl 23 from notch 24. Hammer 22 is thus disengaged from shaft 15, and is driven sharply downward, impelled by spring 27, striking wedge ring 21 which, in turn, displaces radially the various segments of knife 20. The knife 20 is thus driven through the drawn film at a level below shoulder 31 in die 11, cleanly severing the drawn article from the surplus and usually ruffled edge. Further downward movement of piston 14 carries hammer 22 downward until its lower rim 29 rests on shoulder 30 in clamping ring 12, and thereafter results in compressing spring 27 between hammer 22 and spring stop 28 until notch 24 in shaft 15 is again opposite pawl 23, which is forced into engagement with notch 24 by action of spring 40. At this point, hammer 22 is again "cocked." Since hammer 22 is now temporarily stationary, resting on shoulder 30 of ring 12, and since ram 14 has moved downward, breaking contact between wedge ring 21 and hammer 22, the springs 34 now serves to return segmented knife 20 from the cutting position shown in Figs. 2–4, to the retracted, neutral position shown in Fig. 1. The drawn article may be dislodged from piston 14, suitably by an air blast directed through hollow axis 18 of shaft 15, and thence through header 17 and ports 19. The shaft 15 may now be lifted, carrying hammer 22 and ram 14 out of the die. When the ram is clear of clamping ring 12, the latter may be raised, the ring of waste film may be removed and discarded, and the machine is ready for another cycle of operations.

Since knife 20 is only driven outward through the drawn film at a point below shoulders 31, no scoring of smooth walls 32 of die 11 may occur. If the walls are scored below shoulder 31, it is immaterial, since the film is not pressed against these walls and such scoring will not result in scratching the film.

In the present machine, each ram 14 is capable of drawing articles of only one height of wall, i. e., it is capable of only one depth of draw, since the cut-off mechanism is located at a fixed distance above the lower face of the ram. To make articles of different depths it is necessary to change rams, which can be done easily by unscrewing bolts 36, releasing retaining ring 38 from ram 14, then unscrewing the ram 14 from coupling 16 on shaft 15, and finally reassembling the device with a new ram of suitable contour and of the wall height desired.

As previously stated, the die and ram employed may be of round, oval, square, or other polygonal cross-section, and the machine may be used with any thermoplastic organic film capable of being drawn. The die, or the ram, or both, may be heated, as for example, by suitable steam chambers or by electrical means, to facilitate drawing of many films.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A machine for drawing thermoplastic films and for trimming the vertical walls of the shaped articles substantially in a single working operation, comprising a drawing die and a drawing ram co-operative therewith to produce the desired drawn shape, a shaft supporting the ram and of smaller diameter than the ram, means for holding a film blank across the die opening, a radially expansible segmented knife resting on the ram, radially disposed about the shaft, and of the same shape as the cross-sectional contour of the ram, retaining means for preventing any substantial play of said knife until it is positively actuated to expand the knife radially, means operative when the ram and accompanying knife have penetrated a predetermined depth into the die to expand the knife radially beyond the vertical walls of the ram a distance approximating the thickness of the film being drawn, and means for returning the knife segments from the cutting position to their original undisplaced positions.

2. A machine for drawing thermoplastic films and for trimming the vertical walls of the shaped articles substantially in a single working operation, comprising a drawing die and a drawing ram co-operative therewith to produce the desired drawn shape, a shaft supporting the ram and of smaller diameter than the ram, for holding a film blank across the die opening, a radially expansible segmented knife resting on the ram, radially disposed about the shaft, and of the same shape as the cross-sectional contour of the ram, retaining means overlying said knife and co-operating with the ram to form a recess for the knife and to prevent play of the knife until the latter is positively actuated to expand the knife radially, a hammer slidably mounted on the shaft a distance above the knife and in releasable engagement with the shaft, means for releasing the hammer from engagement with the shaft when the ram and accompanying knife have penetrated a predetermined depth into the die, means operative by said hammer for expanding the knife radially beyond the vertical walls of the ram a distance approximating the thickness of the film being drawn, means for returning the hammer to releasable engagement with the shaft, and means for returning the knife segments from the cutting position to the original undisplaced position within the recess provided therefor.

3. A machine for drawing thermoplastic films and for trimming the vertical walls of the shaped articles substantially in a single working operation, comprising a drawing die with a vertical walled opening therethrough which is undercut to provide a peripheral shoulder between the relatively small bore upper part of the die and the relatively large bore lower part thereof, and a drawing ram co-operative with the die to produce the desired drawn shape, a shaft supporting the ram and of smaller diameter than the ram, means for holding a film blank across the die opening, a radially expansible segmented knife resting on the ram, radially disposed about the shaft, and of the same shape as the cross-sectional contour of the ram, retaining means for preventing any substantial play of said knife until it is positively actuated to expand the knife radially, means operative when the ram and accompanying knife have penetrated to a distance within the die such that the knife is below the shoulder in the undercut die wall to expand the knife radially beyond the vertical walls of the ram a distance approximating the thickness of the film which can be drawn in the die, and means for returning the knife segments to their original undisplaced positions.

4. A machine for drawing thermoplastic films and for trimming the vertical walls of the shaped articles substantially in a single working operation, comprising a drawing die with a vertical walled opening therethrough which is undercut to provide a peripheral shoulder between the relatively small bore upper part of the die and the relatively large bore lower part thereof, and a drawing ram co-operative therewith to produce the desired drawn shape, a shaft supporting the ram and of smaller diameter than the ram, means for holding a film blank across the die opening, a radially expansible segmented knife resting on the ram, radially disposed about the shaft, and of the same shape as the cross-sectional contour of the ram, retaining means overlying said knife and co-operating with the ram to form a recess for the knife and to prevent play of the knife until the latter is positively actuated to expand the knife radially, a hammer slidably mounted on the shaft, means for releasing the hammer from engagement with the shaft when the ram and accompanying knife have penetrated to a distance within the die such that the knife is below the shoulder in the undercut wall of the die opening, means operative by the hammer for expanding the knife radially beyond the vertical walls of the ram a distance approximating the thickness of the film being drawn, means for returning the hammer to releasable engagement with the shaft, and means for returning the knife segments from the cutting position to the original undisplaced position within the recess provided therefor.

FREDERICK E. DULMAGE.